(12) United States Patent
Megretski et al.

(10) Patent No.: US 10,744,712 B2
(45) Date of Patent: Aug. 18, 2020

(54) TECHNIQUES FOR FLUID SENSING DURING ADDITIVE FABRICATION AND RELATED SYSTEMS AND METHODS

(71) Applicant: Formlabs, Inc., Somerville, MA (US)

(72) Inventors: Dmitri Megretski, Carlisle, MA (US); Manuel Odendahl, Somerville, MA (US); Eric M. Van Albert, Cambridge, MA (US); Hugh L. Medal, Medford, MA (US)

(73) Assignee: Formlabs, Inc., Somerville, MA (US)

( * ) Notice: Subject to any disclaimer, the term of this patent is extended or adjusted under 35 U.S.C. 154(b) by 569 days.

(21) Appl. No.: 15/248,455

(22) Filed: Aug. 26, 2016

(65) Prior Publication Data

US 2017/0057174 A1 Mar. 2, 2017

Related U.S. Application Data

(60) Provisional application No. 62/211,329, filed on Aug. 28, 2015.

(51) Int. Cl.
| | |
|---|---|
| *B29C 64/135* | (2017.01) |
| *B29C 64/386* | (2017.01) |
| *B29C 64/20* | (2017.01) |
| *B29C 64/393* | (2017.01) |
| *B29C 64/259* | (2017.01) |
| *B29K 105/00* | (2006.01) |

(52) U.S. Cl.
CPC .......... *B29C 64/135* (2017.08); *B29C 64/20* (2017.08); *B29C 64/386* (2017.08); *B29K 2105/0058* (2013.01)

(58) Field of Classification Search
CPC ..... B29C 64/135; B29C 64/20; B29C 64/386; B29K 2105/0058; B33Y 10/00; B33Y 30/00; G01F 23/26; G01F 23/265; G01F 23/266; G01F 23/268; G03G 15/0856
USPC .......................................... 425/135; 264/401
See application file for complete search history.

(56) References Cited

U.S. PATENT DOCUMENTS

| | | | | |
|---|---|---|---|---|
| 9,604,043 | B2* | 3/2017 | King | A61M 1/0058 |
| 2014/0117585 | A1* | 5/2014 | Douglas | B33Y 30/00 |
| | | | | 264/401 |
| 2015/0374292 | A1* | 12/2015 | Wyeth | A61B 5/721 |
| | | | | 600/409 |
| 2016/0046072 | A1* | 2/2016 | Rolland | B33Y 10/00 |
| | | | | 264/401 |
| 2017/0217089 | A1* | 8/2017 | Batchelder | B33Y 30/00 |

* cited by examiner

*Primary Examiner* — Matthew J Daniels
*Assistant Examiner* — Yunju Kim
(74) *Attorney, Agent, or Firm* — Wolf, Greenfield & Sacks, P.C.

(57) ABSTRACT

According to some aspects, an additive fabrication device is provided comprising a container removably attached to the additive fabrication device, and a detector configured to sense a fluid level of photopolymer resin within the container, wherein said detector does not contact said container.

12 Claims, 11 Drawing Sheets

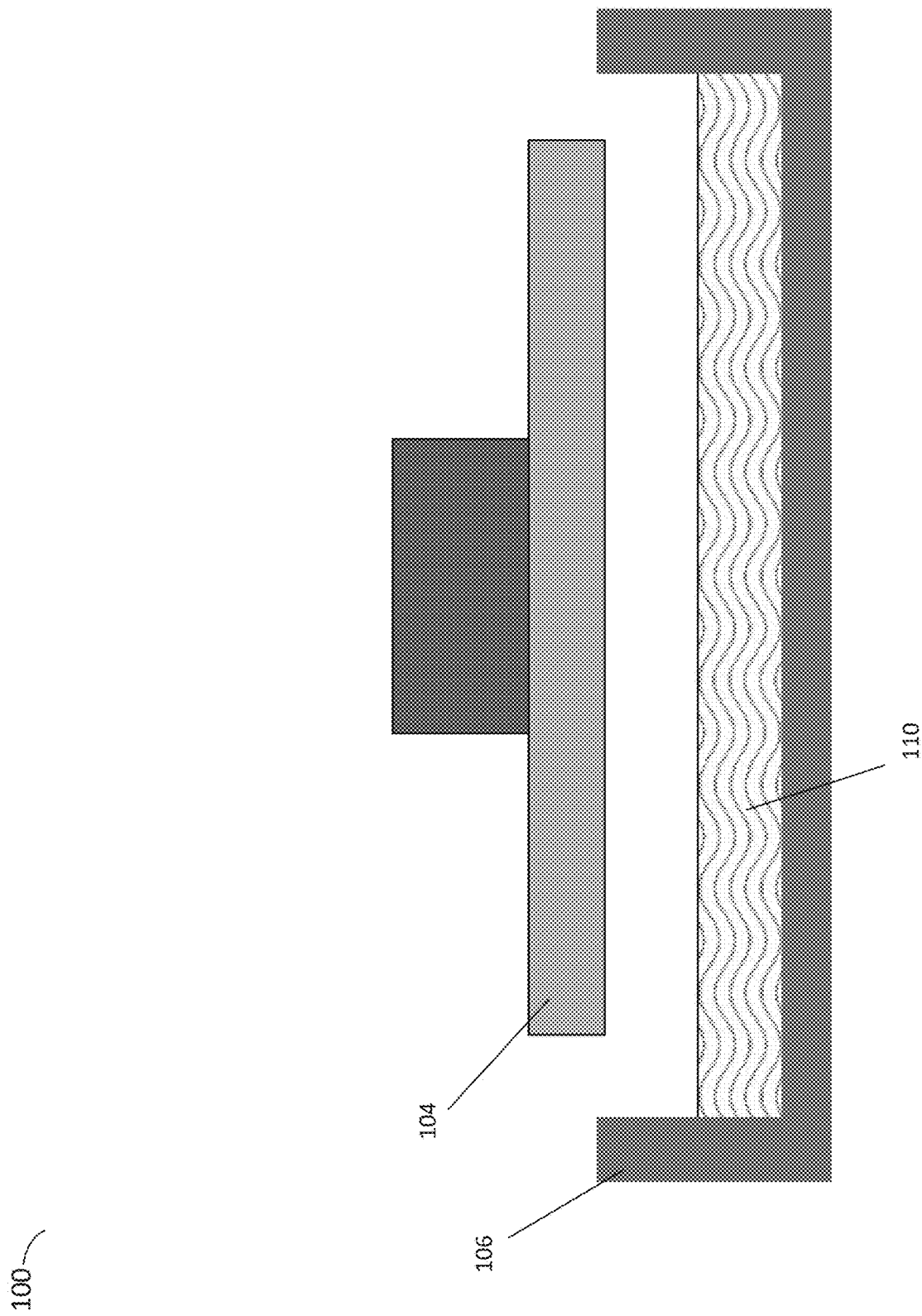

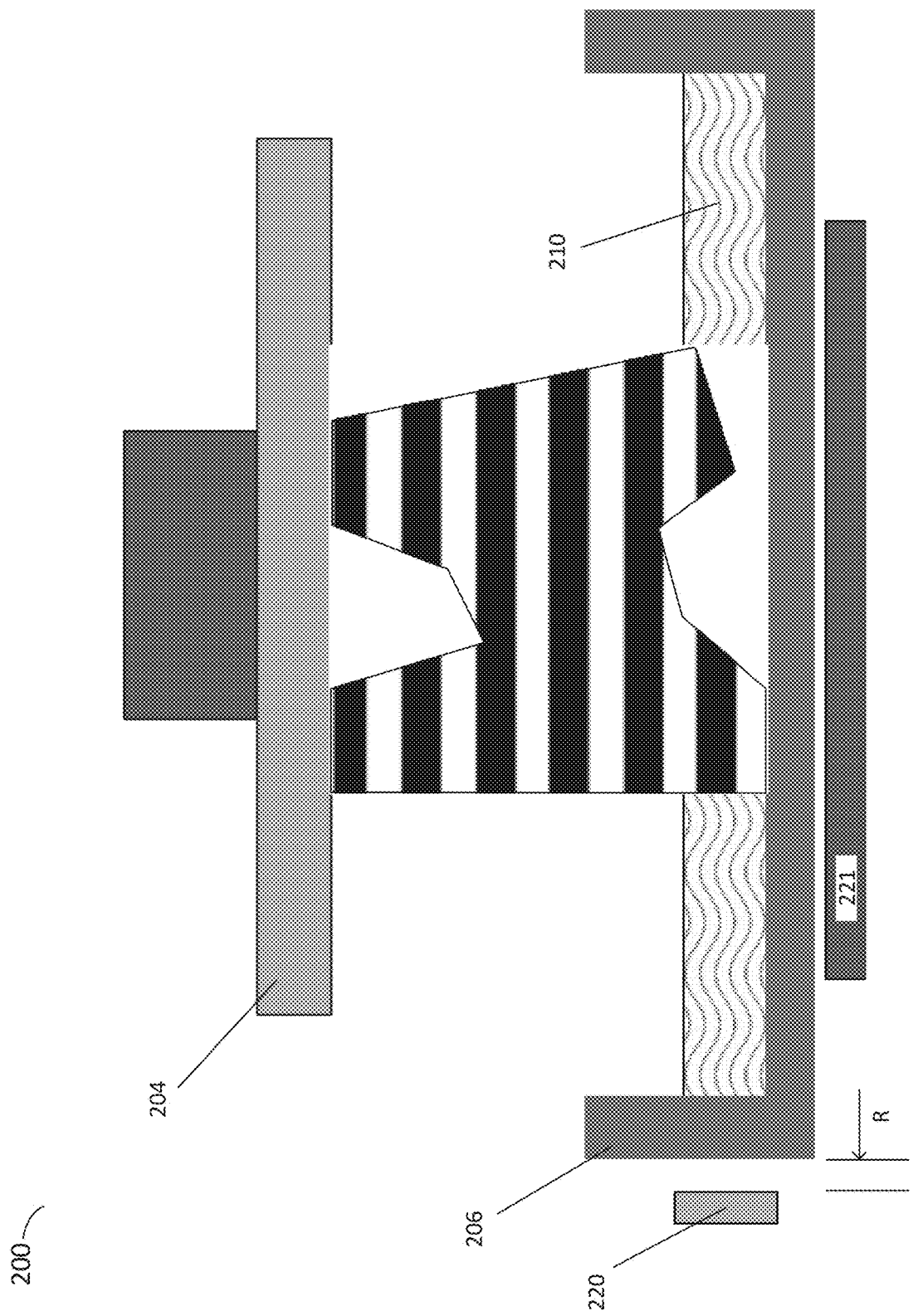

US 10,744,712 B2

TECHNIQUES FOR FLUID SENSING DURING ADDITIVE FABRICATION AND RELATED SYSTEMS AND METHODS

CROSS REFERENCE TO RELATED APPLICATIONS

The present application claims the benefit under 35 U.S.C. § 119(e) of U.S. Provisional Patent Application No. 62/211,329, filed Aug. 28, 2015, titled "Techniques for Removable Tank Fluid Sensing During Additive Fabrication and Related Systems and Methods," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a build platform and then one on top of another. Exposure to actinic radiation cures a thin layer of liquid resin, which causes it to harden and adhere to previously cured layers or to the bottom surface of the build platform.

SUMMARY

The present application relates generally to systems and methods for sensing of a liquid resin within a container of an additive fabrication (e.g., 3-dimensional printing) device.

According to some aspects, an additive fabrication device is provided comprising a container removably attached to the additive fabrication device, and a detector configured to sense a fluid level of photopolymer resin within the container, wherein said detector does not contact said container.

According to some aspects, an additive fabrication device is provided comprising a container removably attached to the additive fabrication device, three or more capacitive sensors coupled to the additive fabrication device, and an air gap between said container and said sensors.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1B depict an illustrative additive fabrication system, according to some embodiments;

FIG. 2 depicts heating and temperature sensing elements of an illustrative additive fabrication device, according to some embodiments;

DETAILED DESCRIPTION

Figure 1B:
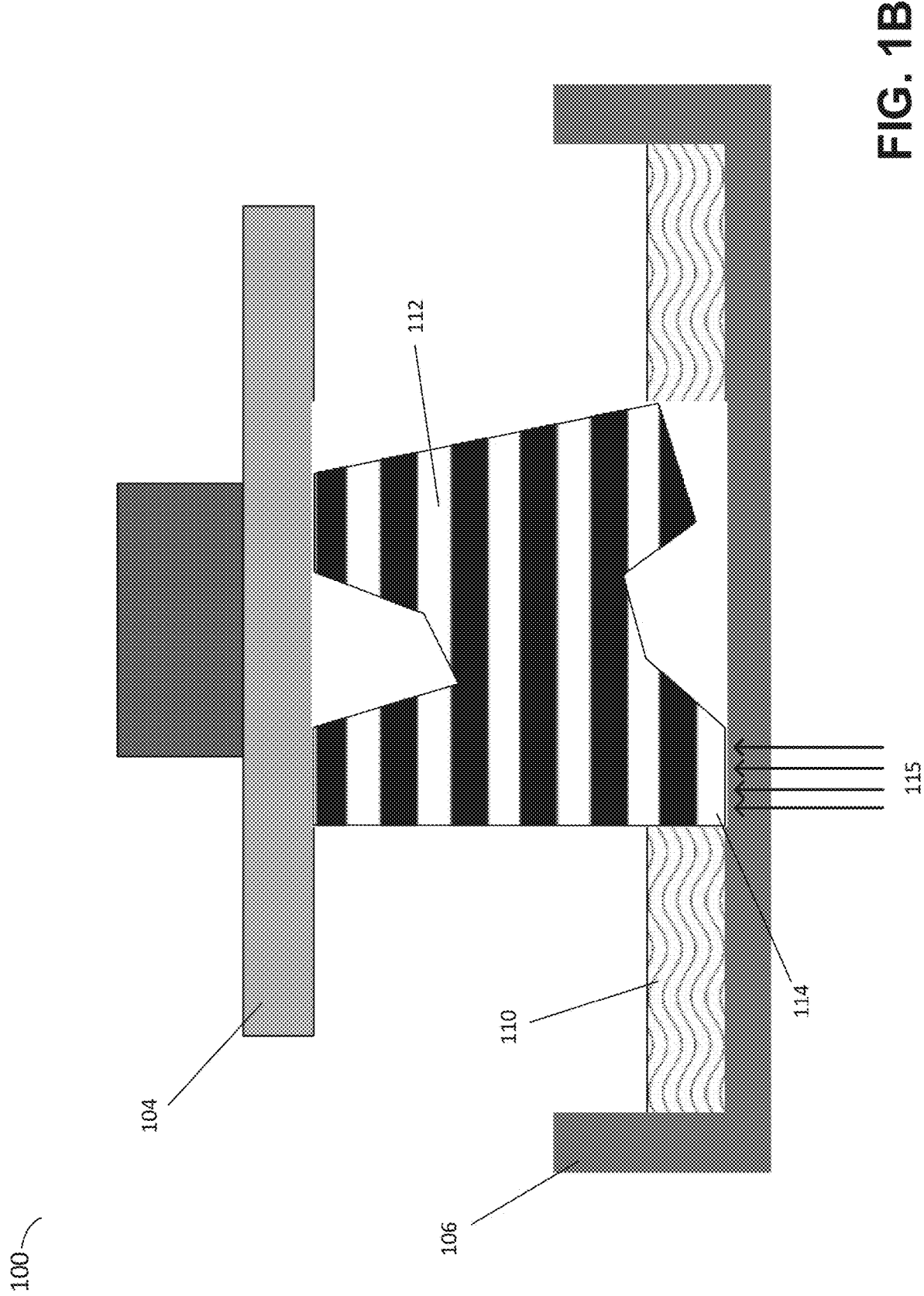

As discussed above, some additive fabrication techniques form solid objects by solidifying (curing) a liquid, such as a photopolymer resin. It is accordingly important when using such a technique to have a sufficient supply of liquid to use for fabrication. While a float or other sensor deployed within a container holding the liquid may provide an indication of how much liquid is in the container, such sensors typically require components to be incorporated into the design of the container. Since the container of an additive fabrication device may be a component that is occasionally replaced, and/or it may be that multiple containers are sometimes used (e.g., in a rotation) within a single device, it can be undesirable to increase the complexity and/or cost of the container. Sensors deployed within a container may also cause misalignment and/or improper insertion or removal of the container into and out of the additive fabrication device. In addition, contact sensors may pose difficulties when used in connection with liquids such as photopolymer resins. As one example, a photopolymer resin may be incompatible with materials used for contact sensors or immersed components or, by virtue of its chemical properties, may contaminate or cause unwanted material buildup on such sensors due to the propensity of photopolymer resin to chemically react to form solid material.

Moreover, additive fabrication techniques that form solid objects from a liquid may produce results that depend upon the temperature of the liquid when it is cured. If an additive fabrication device is calibrated to form solid objects from a liquid under an assumption that the liquid is at a particular temperature, when the liquid is not at the calibration temperature, objects fabricated using the device may be lower in quality than if the liquid were in fact at the calibration temperature. In particular, some resin may not completely cure when its temperature is higher or lower than the calibration temperature, thus leading to possible structural instabilities and/or inaccuracies in the fabricated object.

A temperature sensor may be placed onto a container holding the liquid, but as discussed above, introduction of additional components to the container may be undesirable. Furthermore, a determination of the temperature would need to be interpreted for the additive fabrication device to decide how to adjust fabrication to account for the current temperature, which would require extensive calibration of the device at numerous temperatures.

The inventors have recognized and appreciated techniques for monitoring and controlling conditions of liquid resin within a container of an additive fabrication device without it being necessary to introduce additional components to the container itself. In particular, an additive fabrication device may include sensors configured to determine a liquid resin level within a container and/or a temperature of the liquid resin in the container, without modifications to the container to accommodate such sensors. The sensors may reside within the additive fabrication device adjacent or close to the container to enable measurements of liquid level and liquid temperature. Thus, the additive fabrication device may allow the use of low-cost, replaceable resin containers whilst automatically maintaining a substantially constant resin temperature and a desired amount of resin in the container during fabrication.

According to some embodiments, an additive fabrication device may include one or more heaters configured to heat liquid in a container of the device to a preselected temperature. This allows the device to be calibrated to operate at the preselected temperature and does not require that the device is calibrated to operate at other temperatures. If the preselected temperature is higher than typical ambient temperatures to which the additive fabrication device may be exposed, this may allow use of the additive fabrication device in any desired ambient environment, yet only requires calibration at a single temperature (the preselected temperature) to operate under ideal conditions. A temperature sensor placed within the additive fabrication device may determine the temperature of liquid within a container of the device, which may be provided to a heater to indicate whether the temperature is to be raised or lowered, thereby providing a feedback loop to establish a stable temperature of the liquid.

According to some embodiments, an additive fabrication device may include one or more sensors configured to sense a level of the liquid resin in a container of the device. The sensors may include one or more contact and/or non-contact sensors. In some implementations, the additive fabrication device may include a plurality of capacitive non-contact sensors configured to sense the liquid level in the container. The additive fabrication device can include an automatic dispensing system to dispense liquid resin into the container based on information provided by the sensor(s), thereby providing a feedback loop to establish a desired liquid level in the container.

In the discussion below, various techniques for controlling a liquid resin temperature and level are discussed. It will be appreciated that the additive fabrication device performing such techniques can include one or more processors and/or other suitable controllers to perform monitoring of resin conditions in the device and/or to control elements of the device to alter the conditions of the resin. For example, the device may include a processor configured to receive temperature sensor data indicative of the temperature of resin in a container of the device and further configured to send a signal to one or more heaters of the device to adjust the temperature of the device based on the received sensor data.

To provide an initial overview of the curing process, an illustrative additive fabrication system is depicted in FIGS. 1A-1B. Illustrative stereolithographic printer 100 forms an object in a downward facing direction on a build platform such that layers of the object are formed in contact with a surface of a container in addition to a previously cured layer or the build platform. In the example of FIGS. 1A-1B, stereolithographic printer 100 comprises build platform 104, container 106 and liquid resin 110. A downward facing build platform 104 opposes the floor of container 106, which contains a photopolymer resin 110. FIG. 1A represents a configuration of stereolithographic printer 100 prior to formation of any layers of an object on build platform 104.

As shown in FIG. 1B, an object 112 may be formed layerwise, with the initial layer attached to the build platform 104. In FIG. 1B, the layers of the part 112 are each formed from the same material but are shown in alternating colors merely to visually distinguish them in this example. The container's base surface may be transparent to actinic radiation, such that radiation can be targeted at portions of the thin layer of liquid photocurable resin resting on the base surface of the container. Exposure to actinic radiation 115 cures a thin layer of the liquid resin, which causes it to harden. The layer 114 is at least partially in contact with both a previously formed layer and the surface of the container 106 when it is formed. The top side of the cured resin layer bonds to either the bottom surface of the build platform 104 or (in the example of FIG. 1B) with the previously cured resin layer, in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

As discussed above, some embodiments of the present invention advantageously provide techniques for measuring and/or maintaining the temperature of liquid resin stored within a container, such as container 106. Accordingly, some embodiments of the present invention such as the illustrative embodiment depicted in FIGS. 1A-1B, may include components configured to raise and/or maintain the temperature of photopolymer resin within container 106 without requiring sensing or heating devices to be integrated into container 106 or otherwise contact the photopolymer resin within container 106. Such components may advantageously allow for container 106 to be easily removed and replaced.

FIG. 2 depicts heating and temperature sensing elements of an illustrative additive fabrication device, according to some embodiments. In the example of FIG. 2, stereolithographic printer 200 comprises build platform 204, container 206, liquid resin 210, one or more temperature sensing elements 220, and one or more heating elements 221.

As shown in FIG. 2, a container 206 may be positioned during operation on a support base (not shown) configured with one or more heating elements 222. In the example of FIG. 2, heating element(s) 221 may be advantageously located within or beneath a support base immediately contacting the container 206, so as not to interfere with the insertion and removal of the container. Any portions of the support base may contact the container, and may, or may not, include those portions of the support base adjacent to heating element(s) 221. A sensor 220 is provided adjacent to an edge of container 206.

According to some embodiments, regions of the support base located between heating element(s) 221 and in contact with the container 206 may be formed of a suitable material that provides structural rigidity and/or has a suitable thermal conductivity that heat generated by the heating element(s) easily conducts to the container, such as, but not limited to steel, aluminum or other metals. According to some embodiments, heating element(s) 221 may be distributed so as to introduce heating evenly across the support base. In some implementations, the one or more heating elements 221 may be located far enough away from sensor(s) 220 so as not to impact the reading of the temperature of the liquid resin 210 by the sensor(s).

According to some embodiments, heating element(s) 221 may include any one or more heating elements, such as but not limited to, resistive heating elements of variable capacity. In some cases, the variable capacity of such heating element(s) may depend upon thermal properties of the additive fabrication system and/or on desired operating temperatures. According to some embodiments, a heating element may be controlled in any suitable way to reach and/or maintain a particular temperature, including via the use of on-off electrical activation, pulse width modulation activation, and/or other control schemes.

During operation, heating elements 221 may raise the temperature of regions of the support base located between heating elements and in contact with the container 206 and, via conduction, raise the temperature of the container. Heat introduced via heating element(s) 221 may propagate through the material of the container 206 and, by conduction, into the photopolymer resin within the container 206. In some embodiments, container 206 may be formed, in whole or in part, from a material relatively resistant to the application of heat, such as, but not limited to, a polycarbonate plastic such as a UV stabilized polycarbonate plastic with a heat distortion temperature per ISO 75/A greater than 120° C. and/or a Vicat softening temperature, per ISO 306 greater than 140° C., such as Lexan Exell D polycarbonate, available from SABIC Innovative Plastics. However, in general suitable materials include any material chemically stable to exposure to desired photopolymer materials and mechanically stable in the desired operating temperature range.

As shown in the example of FIG. 2, one or more sensors 220 may be mounted adjacent to an edge of container 206. Additionally, or alternatively, one or more sensors may be placed adjacent to the bottom of the container 206.

According to some embodiments, sensor(s) 220 may be located a distance R away from the edge of container 206 so as to allow for easy removal of container 206 without the container contacting the sensor(s). According to some embodiments, the distance R may be between 1 mm and 20 mm, such as between 5 mm and 15 mm, such as between 8 mm and 10 mm.

In some embodiments, sensor(s) 220 may include one or more contactless temperature sensors, such as microelectromechanical (MEMs) sensors. In some embodiments, sensor(s) 220 may include one or more sensors configured to measure the temperature of an object by absorbing infrared energy from the object including, but not limited to, thermopile sensors. In some implementations, one or more of sensor(s) 220 may be at least partially covered by a protective shroud, thereby protecting the sensor(s) from exposure to photopolymer resin or collisions. Such a shroud may be chosen from a material such as a thermoplastic (e.g., HDPE) that does not negatively impact the thermal sensitivity of the sensor(s). In some cases, merely inserting the container into the additive fabrication device may provide some level of shielding of one or more of the sensors by placing the container structure between the sensor(s) and the liquid resin.

According to some embodiments, sensor(s) 220 may be positioned such that a measured temperature corresponds to a particular location in the container 206. The inventors have observed that the temperature of any given location on the container 206 may be highly correlated with the temperature of the resin stored within the container 206. Although, in general a relationship between the temperature of each location of the container and the resin temperature may be different for each location. As such, a suitable location of the container can be chosen and the system calibrated so that the temperature of the resin may be determined from a measurement of the temperature of the container at the chosen location.

Accordingly, in some embodiments, the temperature of the liquid may be determined without directly measuring the temperature of the liquid, but rather by measuring the temperature of the liquid container and using predetermined calibration data to determine the temperature of the liquid based on the measurement. For instance, calibration data may include temperature correction factors, such as a constant offset or linear relationship, between temperatures measured by sensor(s) 220 of the target location on container 206 and the temperature of the resin stored within container 206. As may be appreciated, it may be advantageous to delay the taking of measurements using sensor 220 during periods of time when the photopolymer resin and container 206 may not have reached a thermal equilibrium, such as upon the addition of additional resin into the container or the beginning of the application of heat.

Figure 3:
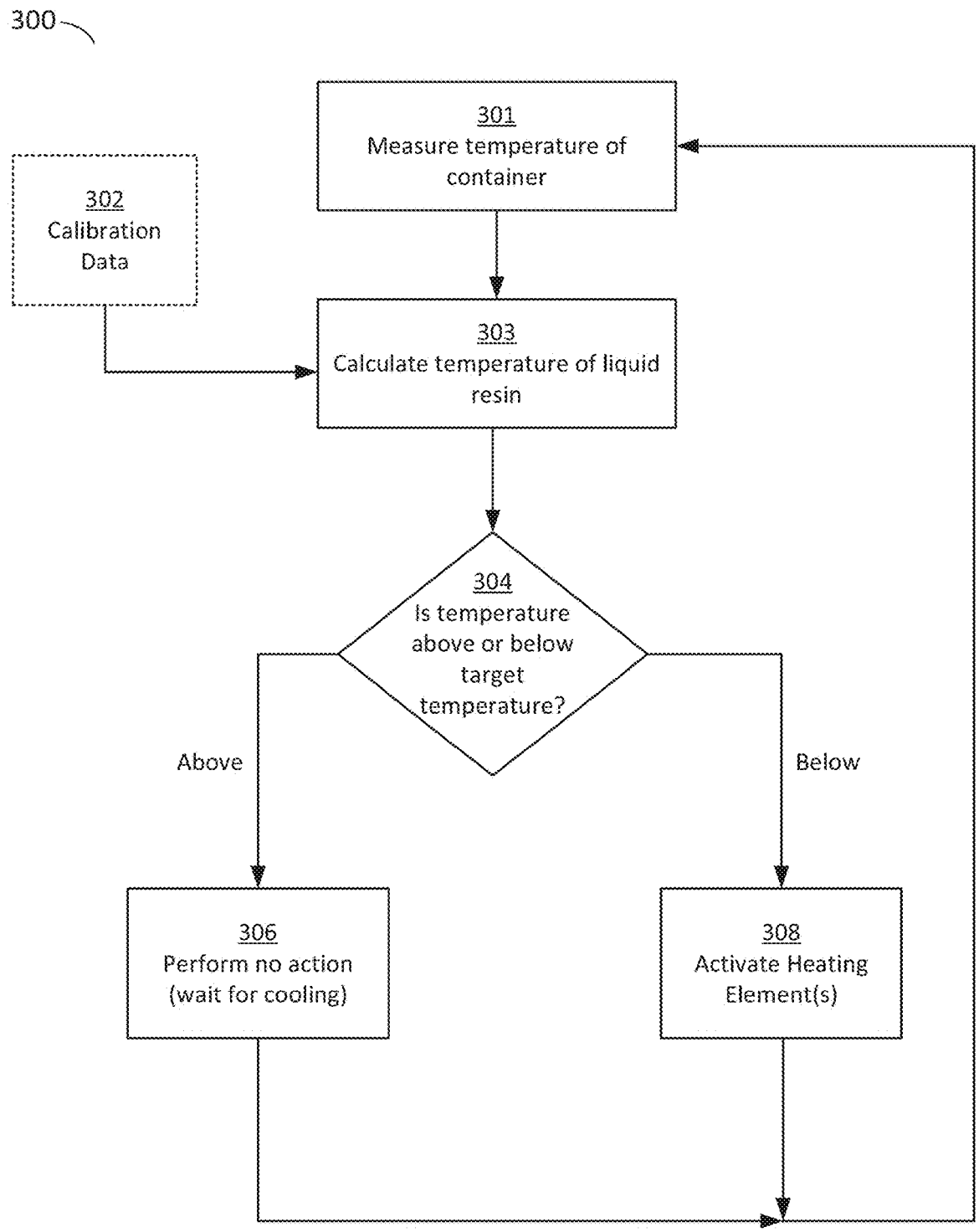
FIG. 3 is a flowchart of a method of sensing and heating a liquid resin container, according to some embodiments.

FIG. 3 is a flowchart of a method of sensing and heating a liquid resin container, according to some embodiments. Method 300 may be performed by a suitable additive fabrication device, such as device 200 shown in FIG. 2.

Method 300 begins in act 301 in which a temperature of a container of an additive fabrication device is measured. As discussed above, a location on or within a container may be selected and a relationship between the temperature of the location and the temperature of liquid resin held in the container determined. The calibration data representing this relationship is stored in data 302 in the example of method 300 and used in act 304 to calculate a temperature of the resin based on the temperature measured in act 301.

In act 304, the temperature determined in act 303 is compared with a target temperature. The inventors have recognized that a target temperature may be preferably above room temperature, since this allows the ambient temperature to cool the liquid resin when its temperature has risen above the target temperature. According to some embodiments, a target temperature may be between 25° C. and 50° C., or between 30° C. and 40° C., such as 35° C.

Irrespective of the target temperature, when it is determined that the temperature is above the target temperature in act 304, the additive fabrication device may wait for a predetermined length of time before returning to act 301 to measure the temperature of the container again. Where the target temperature is above room temperature, this allows the resin to naturally cool via the ambient air during this period. In cases where one or more heating element(s) of the additive fabrication device have been previously activated, these element(s) may be deactivated in act 306.

When it is determined that the temperature is below the target temperature in act 304, one or more heating element(s) of the additive fabrication device are activated in act 308 to increase the temperature of the resin. The length of time during which each heating element(s) is activated in act 308 may be determined based on the difference between the temperature determined in act 304 and the target temperature. For example, the heating element(s) may be activated for a comparatively longer time when the temperature difference is comparatively larger. In some cases, the heating element(s) may have a variable heating output, and in such cases both a length of time and an intensity of the heating output may be determined in act 308 and the element(s) activated using such determined parameters. It will be appreciated that on return to act 301 from act 308, the heating element(s) may or may not remain activated, as the element(s) may remain activated through successive passes through acts 301, 303, 304 and 308 until the target temperature has been reached.

Figure 4:
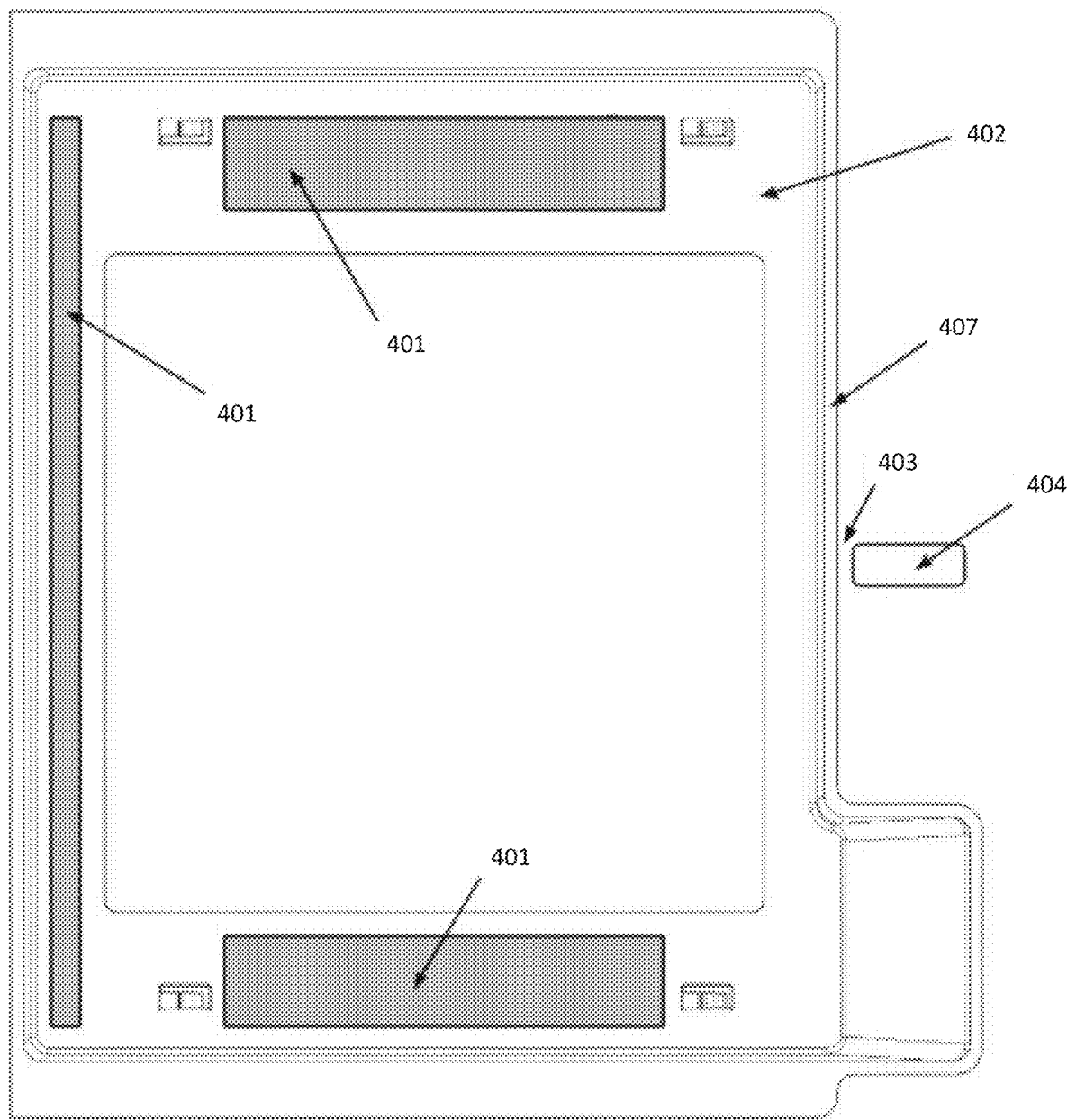
FIG. 4 depicts illustrative heating elements of an additive fabrication device, according to some embodiments.

FIG. 4 depicts illustrative heating elements of an additive fabrication device, according to some embodiments. In the example of FIG. 4, a container 402 is positioned above heating elements 401, which are part of an additive fabrication device (not shown). A sensor 404 is also an element of the additive fabrication device, and is positioned a distance 403 away from the edge 407 of the container 402. According to some embodiments, distance 403 may be between 1 mm and 20 mm, such as between 5 mm and 15 mm, such as between 8 mm and 10 mm.

As discussed above, some embodiments of the present invention advantageously provide techniques for measuring a liquid level of liquid resin stored within a container of an additive fabrication device without requiring sensing or dispensing devices to be integrated into the container or to otherwise contact the liquid within the container.

Figure 5:
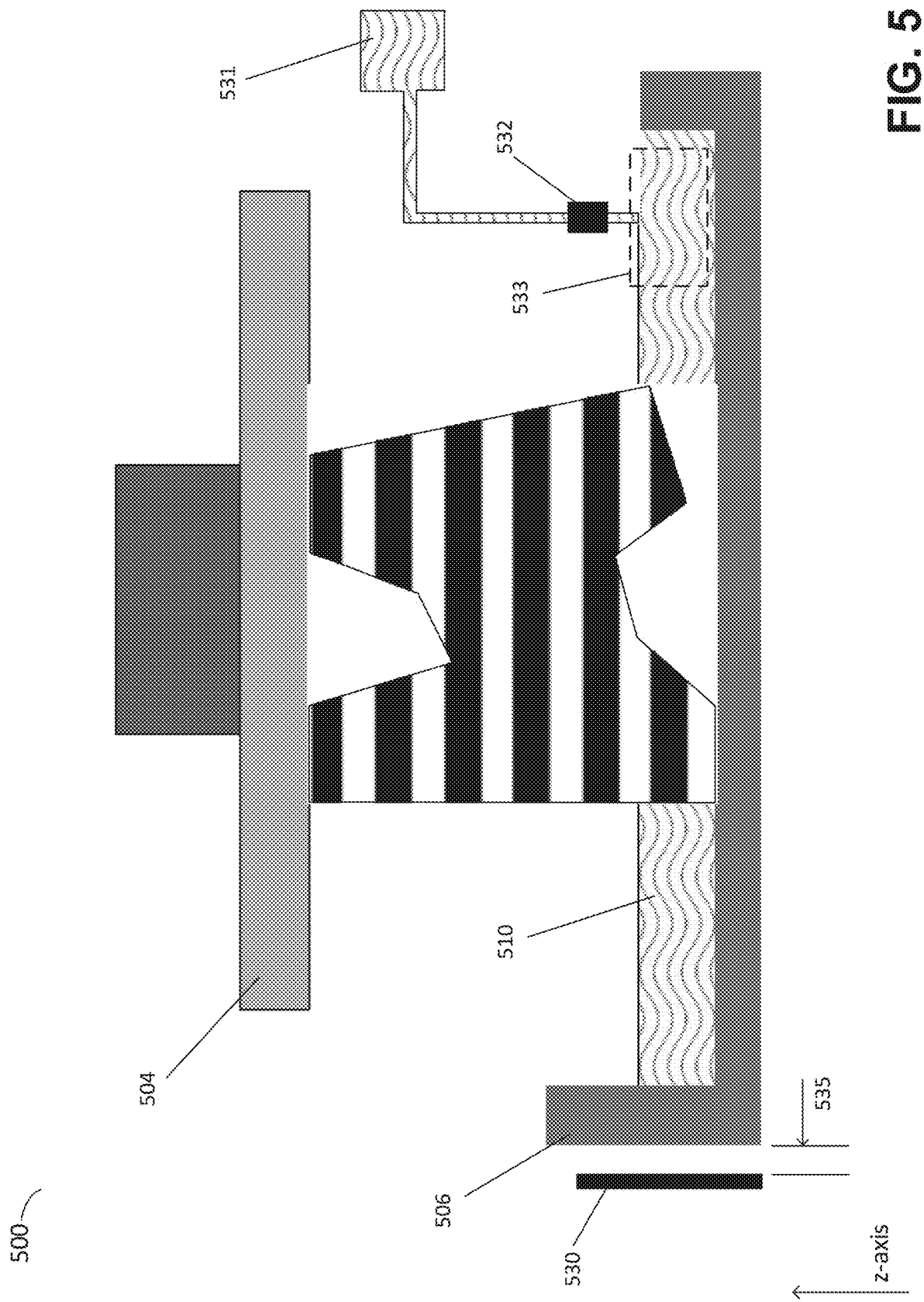
FIG. 5 depicts one or more resin level sensors of an illustrative additive fabrication device, according to some embodiments.

FIG. 5 depicts one or more resin level sensors of an illustrative additive fabrication device, according to some embodiments. In the example of FIG. 5, stereolithographic printer 500 comprises build platform 504, container 506, liquid resin 510 and one or more resin level sensors 530.

It may be generally advantageous to allow for the replenishment of photopolymer resin within the container 506 so as to allow for the formation of objects requiring a greater volume of photopolymer resin than is capable of being stored in the container 506 of a given size. In addition, it may be advantageous to limit the volume of the photopolymer resin within the container 506 during operation in order to improve operation. As one example, lower volumes of photopolymer resin may subject objects being fabricated to lower overall fluid forces due to fluid flows. As another example, lower volumes of photopolymer resin within the working container 506 may reduce the amount of material wasted during post processing or upon a fabrication failure.

Accordingly, embodiments of the present invention may incorporate a reservoir of photopolymer resin 531 and a controller 532 for automatically controlling introduction of resin from the reservoir into the container 506. Any suitable delivery system may be utilized in order to transfer photopolymer resin from a reserve into a container 506. As one example, controller 532 may include an electro-mechanical valve that, when activated, induces fluid flow of photopolymer resin into the container 506 via gravitational forces. Additionally, or alternatively, active pumping techniques may be utilized in controller 532.

The inventors have appreciated that, in some cases, introduction of additional photopolymer resin into container 506 may interfere with intended operation of the fabrication process by introducing extraneous fluid forces. Accordingly, a way of reducing the disruption of such resin additions may be desirable.

According to some embodiments, container 506 may be configured to include a resin introduction zone 533, located in a region distinct from the portions of the container 506 used for exposure of photopolymer resin to actinic radiation. Resin introduction zone 533 may advantageously extend laterally from a given portion of the container at a suitable location to interface with controller 532 which transfers photopolymer resin from reservoir 531. In this way, photopolymer resin may flow into the container 506 without risk of interference with an object being formed and without required a substantially larger container 506. In addition, resin introduction zone 533 may further advantageously include a sloped feature (e.g., see FIGS. 8A-8B below) so as to direct forces from introduction of resin to locations in which fabrication is not taking place, to help ensure smooth flow of resin into the container and/or to reduce the likelihood of issues such as splashing or introduction of bubbles into the photopolymer resin.

As discussed above, additive fabrication device 500 includes one or more resin level sensors 530. Techniques for sensing a level of a liquid may generally be divided into contact and non-contact methods. Contact methods for determining the level of fluid within a container include mechanisms such as floats with positive buoyancy in the intended working fluid or the completion of electric circuits by conductive fluid. Such contact methods, however, may not be well suited for a removable container.

Noncontact liquid sensing methods include techniques such as optical, electrical, or acoustic measurements. Non-contact methods of sensing, however, pose numerous other difficulties, particularly in connection with photopolymer materials. One form of noncontact sensing is capacitive level sensing, which relies upon differences between the dielectric constant of free air, the working fluid, and the material of the container in order to affect a measurable capacitance in a way that can be mathematically related to the geometry of the fluid within the container. Such sensors may be effective for fluids such as water, which has a dielectric constant of approximately 80.4. Typical photopolymer resins, however, have dielectric constants of around 2, which may be similar to the dielectric constant of one or more plastic materials used to form the container. In addition, it may be particularly problematic to sense photopolymer resin levels in a removable container, such as container 506 illustrated in FIG. 5, wherein sensing must be performed through a container wall located an unknown, and variable, distance from the sensor. As one example, "noncontact" capacitive sensing typically requires capacitive sensors to be positioned as close as possible to the liquid to be measured and located a known preset distance from said liquid, such as mounted onto the side of a container. Such a mounting would be undesirable for a removable container. These challenges mean that capacitive sensing has heretofore not been an effective option for sensing photopolymer resin levels in removable container.

Embodiments of the present invention overcome these difficulties, and others, by taking readings from multiple capacitive sensing regions in order to determine the level of resin within a container and integrating multiple capacitive readings in order to compensate for the low dielectric constant of photopolymer resin, as well as substantial variability in the position of the container to be measured.

According to some embodiments, sensor(s) 530 may include multiple capacitive sensors (or, equivalently, multiple capacitive sensing regions, as the number of distinct sensor components is not critical) each connected to a common measuring device (not shown) configured to receive a reading from each sensor individually. A liquid resin level in the container 206 may be determined based on the readings received from the capacitive sensors and, in some cases, may be determined based also on calibration data associated with the capacitive sensors. In some cases, such calibration data may be associated with properties of the container 506, as discussed below.

According to some embodiments, sensor(s) 530 may include multiple capacitive sensing regions each formed of a conductive material and connected to a capacitance measuring device (e.g., utilizing a digital device that converts capacitance to some other measuring unit) and to separate channels of a multi-channel measuring device. According to some embodiments, such a measuring device may be connected to a common ground source.

In some embodiments, one or more capacitive sensing regions of sensor(s) 530 may be surrounded with an active shield. Such active shielding may advantageously reduce the influence of noise and sensing artifacts from field effects at the edges of each sensing region. In some embodiments, an active shield may be positioned on the side of sensing regions away from the container location, so as to further isolate the capacitive sensing regions from interference. Such a shield may comprise any number of materials suitable for active shielding, such as copper traces, foil, and/or other conductive material(s).

In some embodiments, one or more capacitive sensing regions of sensor(s) 530 may be covered by a protective material to avoid damage, such as a vinyl coating. In some embodiments, it may be advantageous for one or more capacitive sensing regions of sensor(s) 530 to be of approximately the same geometry and surface area and in approximately the same location and orientation, so as to ensure equal exposure to environmental influences. This may allow for easier subtraction of environmental effects since those effects could be assumed to produce the same results in each capacitive sensor when the sensors have the same size and are located in approximately the same position.

Readings from each individual sensing region of sensor(s) 530 may vary, in part, due to the level of the resin in container 506. However, said readings may also vary based on the distance 535 between the sensor(s) 530 and the container 506, a distance which in the case of a removable container is variable and typically unknown. In addition, readings may vary based on a variety of environmental effects causing drift and other forms of interference. When used in combination, however, the multiple capacitive sensing regions may be used to determine fluid level height, compensating for environmental interference or drift as well as a variable distance between the sensors and the removable container.

The inventors have recognized that a portion of the capacitive sensing region signals due to the distance 535 between sensing regions of sensor(s) 530 and the container 506 may be effectively constant across each capacitive sensing region. Moreover, environmental noise may influence readings from all sensing regions of sensor(s) 530, particularly where said sensing regions are of uniform size, shape, and in substantially the same location. The commonality of these extraneous signals may make it possible to determine an estimated fluid level based upon the portion of the signal from the capacitive sensing regions due to the changing fluid levels. In particular, some embodiments may utilize the differences and/or gradient, between the capacitive sensing regions of sensor(s) 530 to provide an accurate estimate of the liquid resin level.

According to some embodiments, a level reading from one or more capacitive sensing regions of sensor(s) 530 may be performed in the following manner. In a first step, a capacitance reading from each capacitive sensing region of sensor(s) 530 is taken. Capacitive readings from such sensors may contain noise due to the operation of electrical devices, electrical instabilities, and/or due to other transient phenomena. Accordingly, it may be advantageous to select a sampling rate and to average values from the sensing regions over a number of samples. In some embodiments, the inventors have experimentally determined that taking 400-600 samples over a 5-6 second interval provides average sensor readings with acceptable standard deviations. In some embodiments, such samples are taken separately from each capacitive sensing region of sensor(s) 530, while in some embodiments readings may be taken of each region concurrently.

In a second step, differences $D_n$ between readings for adjacent pairs of sensing regions may be calculated. Once determined, these differences may be used to provide accurate estimates of the fluid level of resin within the container. In particular, the inventors have determined that in some implementations the relationship between the values $D_n$ is strongly correlated with the liquid level of the resin within a container. As a result, known resin liquid levels may be used in order to generate a function of $D_n$ capable of providing an accurate estimate of resin function.

For example, for three sensing regions in a row there are two adjacent pairs of sensing regions. Differences $D_1$ and $D_2$ between readings from adjacent pairs of regions can be determined, and the estimation function determined:

$$u \times D_1^2 + v \times D_2^2 + w \times D_1 \times D_2 + x \times D_1 + y \times D_2 + z$$

with experimentally determined parameters u, v, w, x, y, and z as calibration data. Once calibrated, estimated resin liquid levels may be determined by evaluating the polynomial for measured values of $D_1$ and $D_2$.

In some embodiments, additional factors impacting the values of $D_n$ may be taken into consideration when preparing a mapping between $D_n$ and calculated resin liquid levels, including ambient temperature and humidity.

In some embodiments, calibration data used to interpret the readings from sensor(s) 530 may depend at least in part on properties of the photopolymer resin 510 within the container 506. This may, for example, be due in part to variable dielectric properties of different photopolymer resins.

In some embodiments, calibration data used to interpret the readings from sensor(s) 530 may depend in part on properties of the container 506. For instance, the geometry or material used to form the container. In these cases, and others, it may be advantageous to use alternative calibrations based upon the specific resin and/or container to be utilized. In some embodiments, the user may be required to provide such identifications. In other embodiments, however, a container may be identified based upon a identifier associated with said container. Said identifier may be capable of being electronically read using any suitable techniques. Based upon the identifier, the additive fabrication device 500 may calculate a liquid resin level based on a particular set of calibration data associated with the identifier. In some cases, such calibration data may be baseline calibration data modified using alteration data retrieved based on the identifier.

In some embodiments, calibration data and/or alteration data may be stored on an electronic media disposed within the container and capable of being electronically read. As will be appreciated, such techniques may also be utilized with regards to particular types of resin to be used, particularly in embodiments where resin is stored within a replaceable reservoir which may be so identified for use in determining appropriate calibration values. Additionally, or alternatively, calibration data and/or alteration data may be stored in a computer recordable medium of the additive fabrication device.

Figure 6:
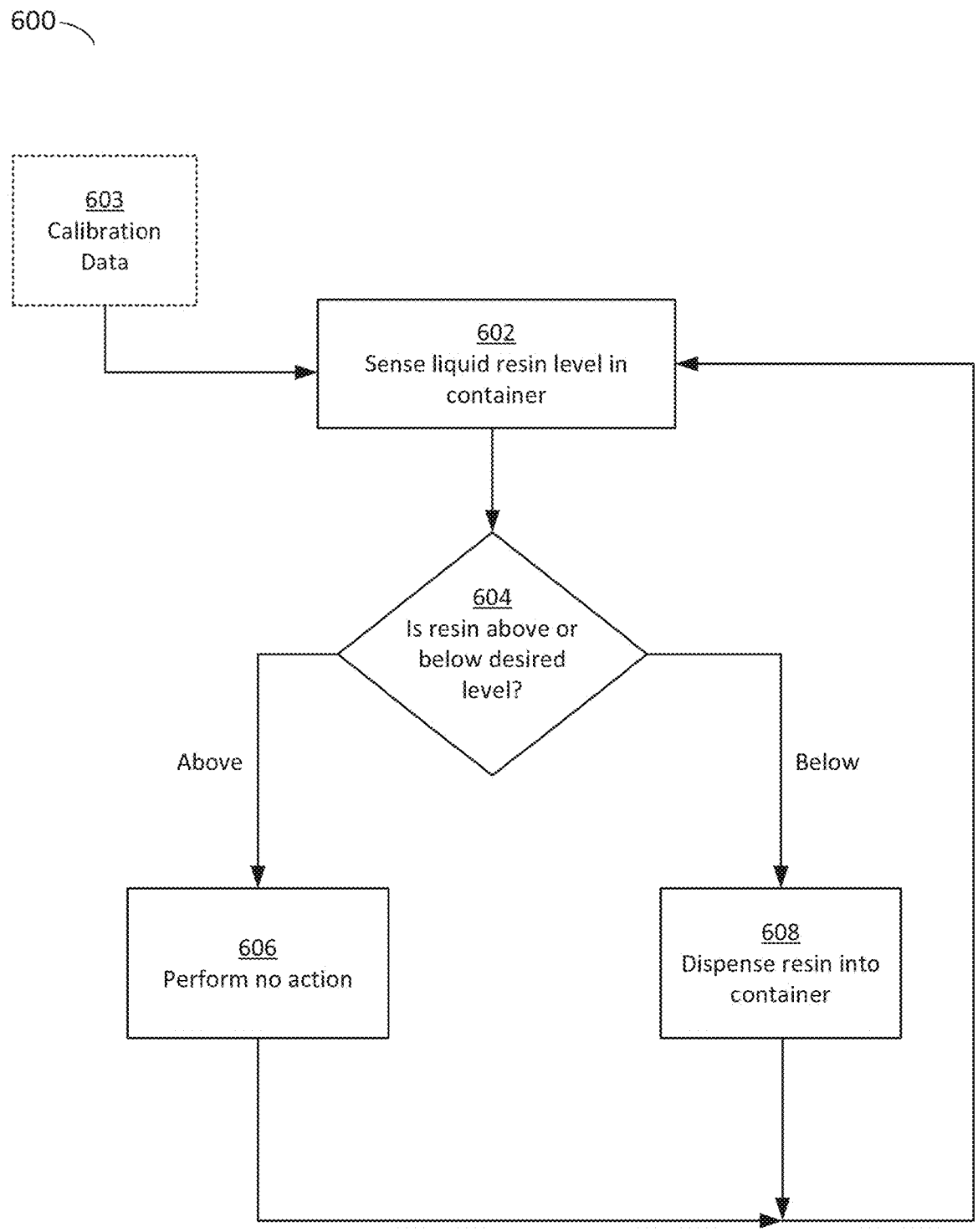
FIG. 6 is a flowchart of a method of sensing a level of a resin container of an additive fabrication device, according to some embodiments.

FIG. 6 is a flowchart of a method of sensing a level of a resin container of an additive fabrication device, according to some embodiments. Method 600 may be performed by a suitable additive fabrication device, such as device 500 shown in FIG. 5.

Method 600 begins in act 602 in which a liquid resin level of a container of an additive fabrication device is measured. As discussed above, one or more sensors (e.g., capacitive sensors) may be used to sense the liquid level without contacting the liquid resin. The liquid level may be calculated based on calibration data 603, which has been previously determined to allow calculation of the level based on readings from one or more sensors.

In act 604, the liquid resin level determined in act 602 is compared with a target level. When the level is greater than target, no action may be taken in the example of FIG. 6 in act 606. Alternatively, when the level is lower than a target, in act 608 resin may be automatically dispensed into the container (e.g., via a reservoir and controller, such as reservoir 531 and controller 532 shown in FIG. 5).

After act 606 or 608 is performed, the method 600 returns to act 602. It will be appreciated that various delays or wait period may be added between any suitable pair of acts in method 600 so that a level is sensed at a desired frequency.

In some embodiments, a method similar to method 600 may be performed to automatically determine whether the level of photopolymer resin within a container is at, or approaching, maximum desired levels, so as to avoid overfilling during a replenishment step.

Figure 7A:
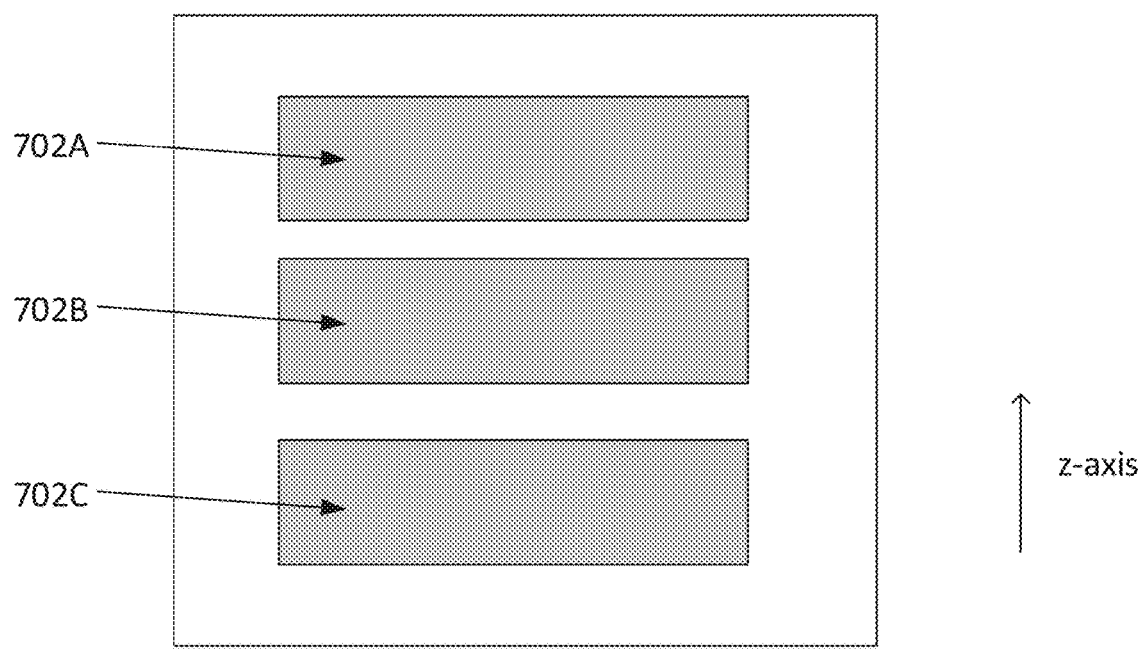
FIGS. 7A-7B depict illustrative arrangements of capacitive sensing regions of an additive fabrication device, according to some embodiments.
Figure 7B:
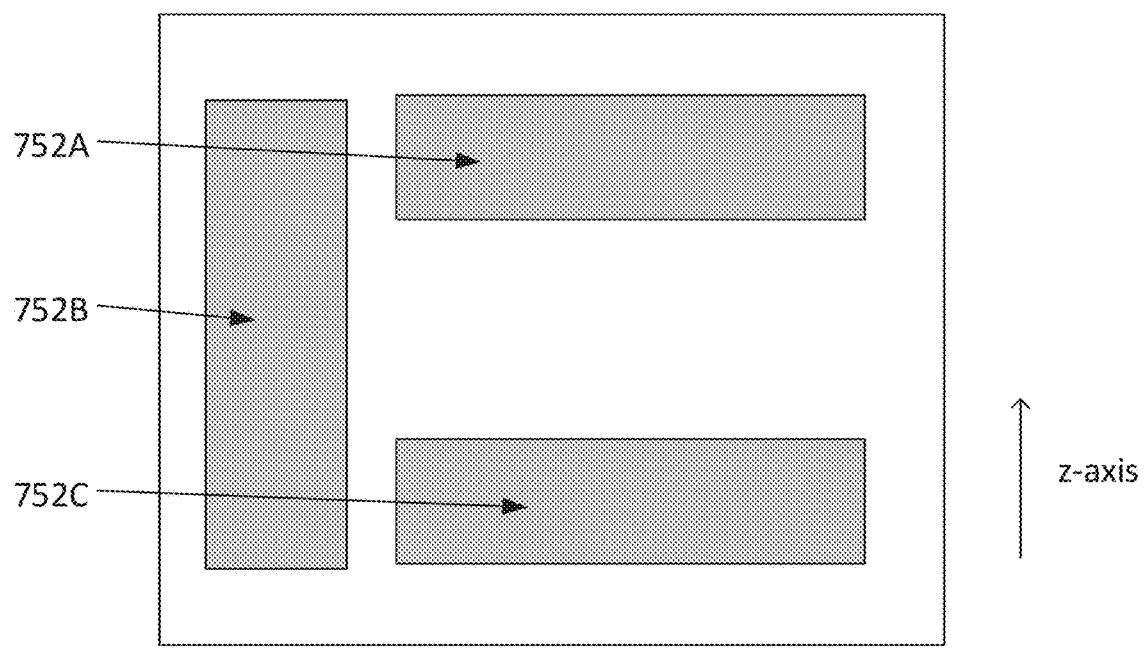

FIGS. 7A-7B depict illustrative arrangements of capacitive sensing regions of an additive fabrication device, according to some embodiments.

The illustrated sensing regions 702A-C and 752A-C may be arrayed along the height of a container (e.g., container 506 shown in FIG. 5) containing resin. To illustrate how the sensing regions are aligned with a container in the example of FIGS. 7A-7B, the z-axis is illustrated. For example, the sensing regions may be aligned vertically along the side of a container, facing the side surface of the container.

As discussed above, one way to calibrate multiple capacitive sensing regions is as a function of the differences between adjacent sensing regions. In the example of FIG. 7A, difference $D_1$ may be determined based on the difference between the capacitance readings previously taken for 702A and 702B. Similarly, difference $D_2$ may be determined based on the difference between the capacitance readings previously taken for 702B and 702C.

In the example of FIG. 7B, capacitive sensing region 702B may be extended vertically alongside capacitive sensors 702A, 702B, and 702C. According to some embodiments, capacitive sensors 702A, 702B and 702C may have the same shape, the same surface area, or be have same surface area and shape.

Figure 8A:
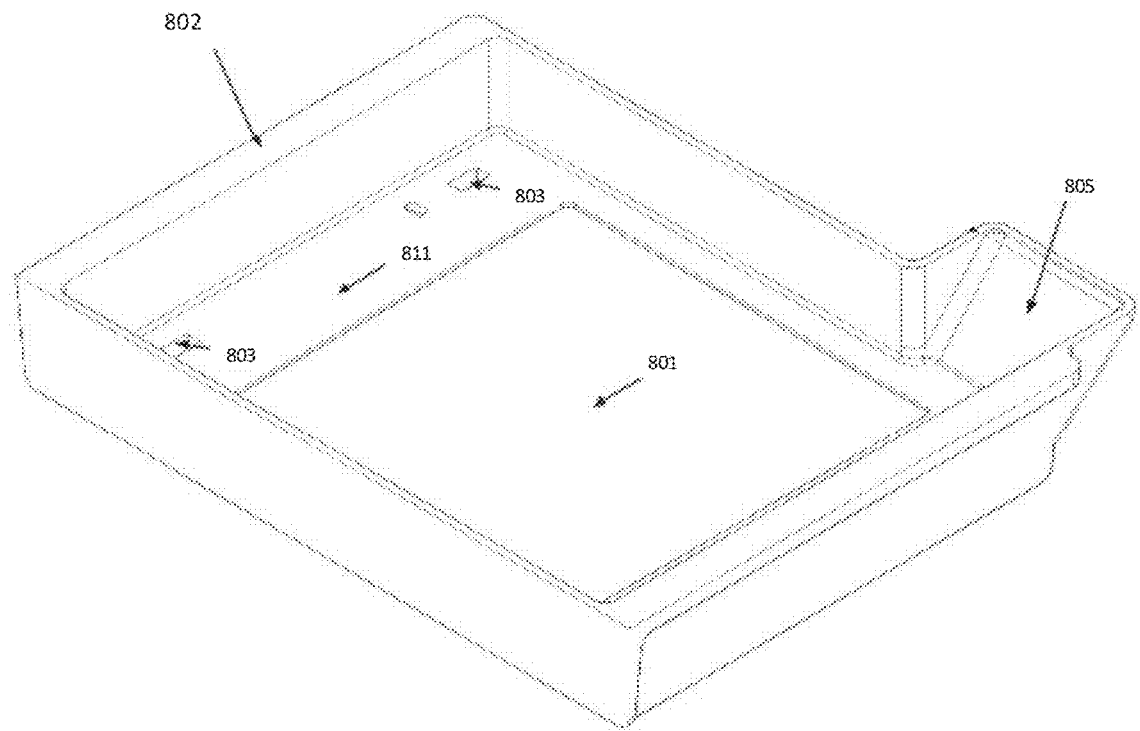
FIGS. 8A-8B depict an illustrative removable container for an additive fabrication device, according to some embodiments.
Figure 8B:
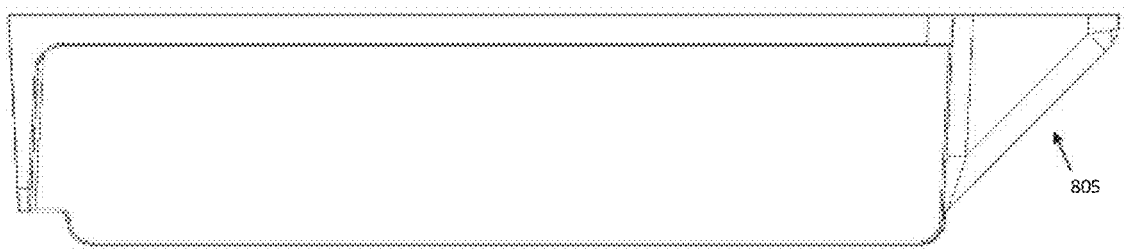

FIGS. 8A-8B depict an illustrative removable container for an additive fabrication device, according to some embodiments. A suitable container for use with the techniques described above is depicted in further detail in FIGS. 8A-8B to illustrate portions of this aspect of the present invention.

The illustrated container comprises several features, including an actinically transparent window 801 located in the bottom 811, and surrounding walls 802, and registration/locking features 803. The illustrated container also includes a sloped feature 805 which, as discussed above, may minimize the effect of resin introduced into the container upon the fabrication process. One example of a suitable container may be found in U.S. patent application Ser. No. 14/734,141, titled "Improved Resin Container for Stereolithography," filed on Jun. 9, 2015, and incorporated herein by reference in its entirety.

Figure 9A:
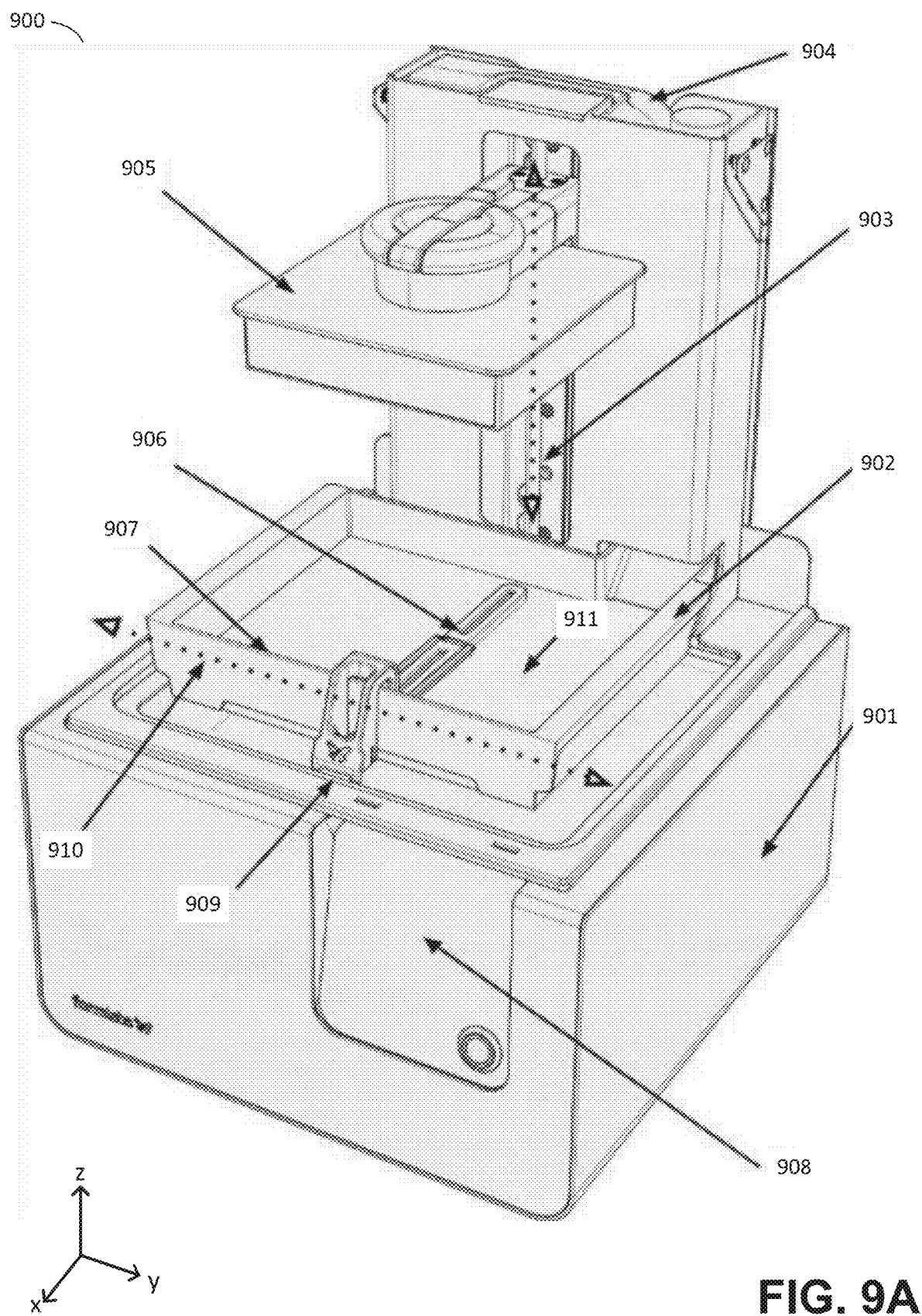
FIGS. 9A-9B are schematics showing two different views of an illustrative stereolithographic printer on which aspects of the invention may be implemented, according to some embodiments.
Figure 9B:
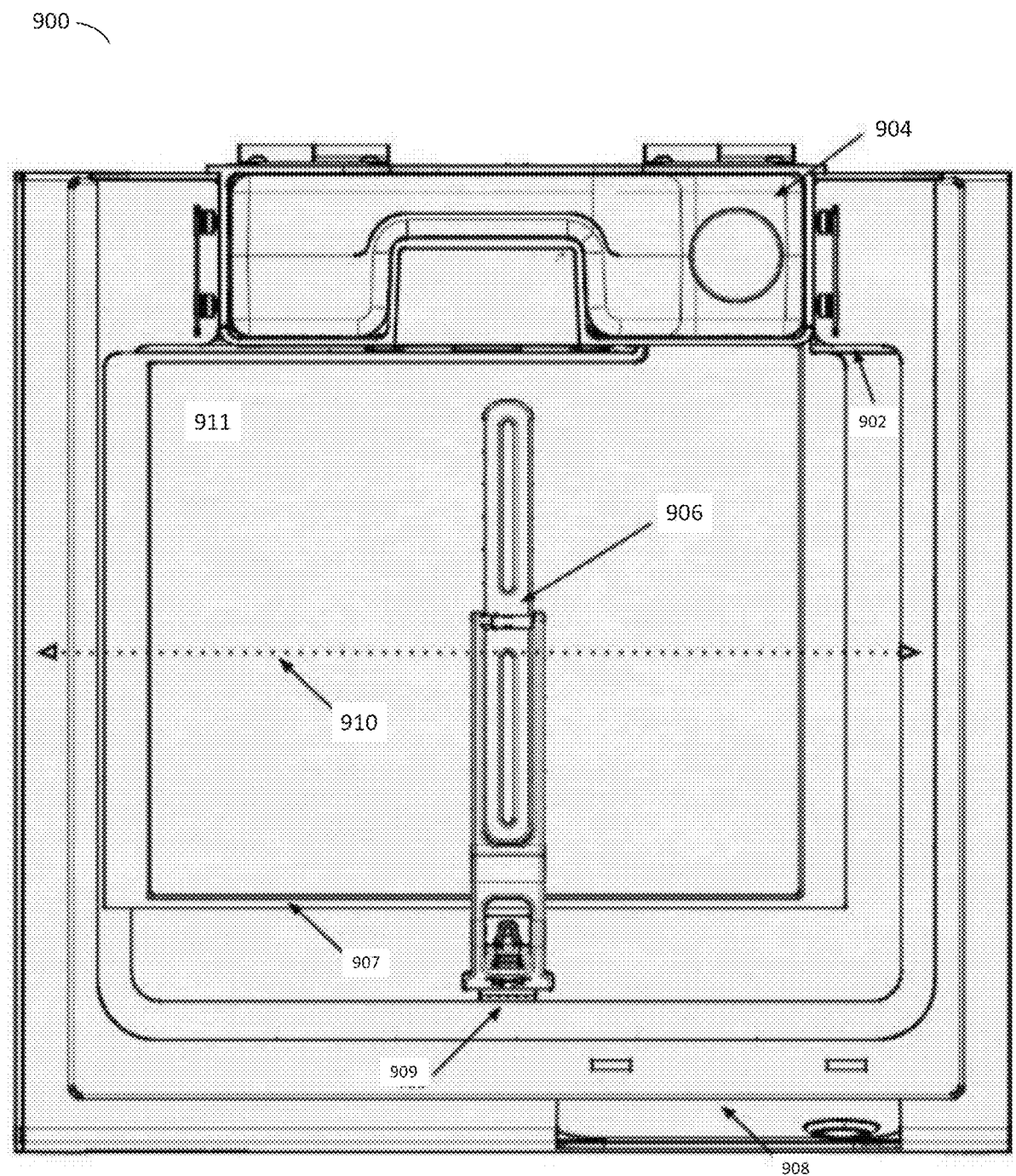

FIGS. 9A-9B are schematics showing two different views of an illustrative stereolithographic printer on which aspects of the invention may be implemented, according to some embodiments.

Illustrative stereolithographic printer 900 comprises a support base 901, a display and control panel 908, and a reservoir and dispensing system for photopolymer resin 904. The support base 901 may contain various mechanical, optical, electrical, and electronic components that may be operable to fabricate objects using the system. During operation, photopolymer resin may be dispensed from the dispensing system 904 into container 902. Build platform 905 may be positioned along the vertical axis 903 such that the bottom facing layer of an object being fabricated, or the bottom facing layer of build platform 905 itself, is a desired distance from the bottom 911 of container 902. The bottom 911 of the container 902 may be advantageously transparent to actinic radiation generated by a source located within the support base (not shown) such that liquid photopolymer resin located between the bottom 911 of container 902 and the bottom facing portion of build platform 905 or an object being fabricated thereon, may be exposed to the radiation. Upon exposure to such actinic radiation, the liquid photopolymer may be cured and attached to the bottom facing portion of build platform 905 or to an object being fabricated thereon. (FIGS. 9A-B represent a configuration of stereolithographic printer 901 prior to formation of any layers of an object on build platform 905.) A wiper 906 is additionally provided, capable of motion over side 907 along the horizontal axis of motion 910 and which may be removably mounted onto the support base at 909. The wiper may be coupled to one or more actuators (e.g., stepper motors, belts attached to motor(s), etc.) that produce lateral movement of the wiper across the surface of the container.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device comprising:
a container removably attached to the additive fabrication device;
a detector comprising first, second and third sensing regions, each of the first, second and third sensing regions configured to sense a fluid level of photopolymer resin within the container, wherein said detector does not contact said container; and
at least one controller configured to:
receive first, second and third capacitive readings from the first, second and third sensing regions of the detector, respectively;
determine a difference between the first capacitive reading and the second capacitive reading;
determine a difference between the second capacitive reading and the third capacitive reading; and
calculate the fluid level of photopolymer resin within the container based on a mathematical formula that is a function of the determined difference between the first capacitive reading and the second capacitive reading, the determined difference between the second capacitive reading and the third capacitive reading, and one or more previously determined calibration values.

2. The additive fabrication device of claim 1, wherein the at least one controller is further configured to select the one or more previously determined calibration values based on a type of the photopolymer resin within the container.

3. The additive fabrication device of claim 1, wherein the at least one controller is further configured to determine the difference between the first capacitive reading and the second capacitive reading based on average capacitive readings received from the first and second sensing regions, respectively, over a number of received capacitive readings.

4. The additive fabrication device of claim 1, wherein the calculation of the fluid level of photopolymer resin within the container is further based at least in part on an indication of ambient temperature.

5. The additive fabrication device of claim 1, wherein calculating the fluid level of photopolymer resin within the container comprises calculating a value of a polynomial that is a function of at least the determined difference between the first capacitive reading and the second capacitive reading, the determined difference between the second capacitive reading and the third capacitive reading, and one or more previously determined calibration values.

6. The additive fabrication device of claim 1, wherein the detector comprises a fourth sensing region.

7. The additive fabrication device of claim 1, wherein the at least one controller is further configured to obtain an identifier associated with the container and to select the one or more previously determined calibration values based on the identifier.

8. An additive fabrication device comprising:
a container removably attached to the additive fabrication device;
first, second and third capacitive sensors coupled to the additive fabrication device;
an air gap between said container and said capacitive sensors; and
at least one controller configured to:
receive first, second and third capacitive readings from the first, second and third sensors, respectively,
determine a difference between the first capacitive reading and the second capacitive reading;
determine a difference between the second capacitive reading and the third capacitive reading; and
calculate the fluid level of photopolymer resin within the container based on a mathematical formula that is a function of the determined difference between the first capacitive reading and the second capacitive reading, the determined difference between the second capacitive reading and the third capacitive reading, and one or more previously determined calibration values.

9. The additive fabrication device of claim 8, wherein the at least one controller is further configured to select the one or more previously determined calibration values based on a type of the photopolymer resin within the container.

10. The additive fabrication device of claim 8, wherein calculating the fluid level of photopolymer resin within the container comprises calculating a value of a polynomial that is a function of at least the determined difference between the first capacitive reading and the second capacitive reading, the determined difference between the second capacitive reading and the third capacitive reading, and one or more previously determined calibration values.

11. The additive fabrication device of claim 8, further comprising a fourth capacitive sensor.

12. The additive fabrication device of claim 8, wherein the at least one controller is further configured to obtain an identifier associated with the container and to select the one or more previously determined calibration values based on the identifier.

* * * * *